(12) United States Patent
Abele et al.

(10) Patent No.: US 9,650,008 B2
(45) Date of Patent: May 16, 2017

(54) VEHICLE OCCUPANT RESTRAINT DEVICE COMPRISING AN ADAPTIVE KNEE AIRBAG

(71) Applicant: TRW Automotive GmbH, Alfdorf (DE)

(72) Inventors: Timo Abele, Abtsgmund (DE); Werner Freisler, Heubach (DE); Sven Oliver Tamme, Ostfildern (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/404,713

(22) PCT Filed: May 29, 2013

(86) PCT No.: PCT/EP2013/001585
§ 371 (c)(1),
(2) Date: Dec. 1, 2014

(87) PCT Pub. No.: WO2013/182281
PCT Pub. Date: Dec. 12, 2013

(65) Prior Publication Data
US 2015/0183391 A1 Jul. 2, 2015

(30) Foreign Application Priority Data
Jun. 5, 2012 (DE) .................. 10 2012 011 036

(51) Int. Cl.
*B60R 21/206* (2011.01)
*B60R 21/239* (2006.01)
(Continued)

(52) U.S. Cl.
CPC .......... *B60R 21/206* (2013.01); *B60R 21/215* (2013.01); *B60R 21/231* (2013.01);
(Continued)

(58) Field of Classification Search
CPC . B60R 21/206; B60R 21/2338; B60R 21/239; B60R 2021/23169;
(Continued)

(56) References Cited

U.S. PATENT DOCUMENTS 5,240,283 A * 8/1993 Kishi .................... B60R 21/233
280/729
5,765,863 A * 6/1998 Storey ................... B60R 21/207
280/729
(Continued)

FOREIGN PATENT DOCUMENTS

DE 102005050176 5/2006
DE 102005041296 4/2007
(Continued)

*Primary Examiner* — Barry Gooden, Jr.
(74) *Attorney, Agent, or Firm* — Tarolli, Sunheim, Covell & Tummino LLP (57) ABSTRACT

A vehicle occupant restraint device having a knee airbag deployable between an instrument panel and the legs of a vehicle occupant and including an airbag sheath and at least one exhaust orifice formed therein. The vehicle occupant restraint device further has features for qualifying the build of the vehicle occupant, an activating unit for selectively releasing the exhaust orifice and a control which actuates the activating unit depending on the qualification of the build of the vehicle occupant.

12 Claims, 5 Drawing Sheets

(51) Int. Cl.
  *B60R 21/231* (2011.01)
  *B60R 21/215* (2011.01)
  *B60R 21/2338* (2011.01)

(52) U.S. Cl.
  CPC .... *B60R 21/239* (2013.01); *B60R 2021/2395* (2013.01); *B60R 2021/23169* (2013.01); *B60R 2021/23384* (2013.01)

(58) Field of Classification Search
  CPC B60R 2021/23382; B60R 2021/23384; B60R 2021/2395; B60R 21/233; B60R 2021/23308; B60R 2021/23324; B60R 2021/23332
  See application file for complete search history.

(56) References Cited

U.S. PATENT DOCUMENTS

| | | | | |
|---|---|---|---|---|
| 6,932,385 | B2 * | 8/2005 | Hawthorn | B60R 21/233 280/736 |
| 7,192,050 | B2 * | 3/2007 | Sato | B60R 21/23138 280/729 |
| 7,445,237 | B2 * | 11/2008 | Boyle, III | B60R 21/233 280/739 |
| 7,883,110 | B2 * | 2/2011 | Pausch | B60R 21/2338 280/739 |
| 7,954,850 | B2 * | 6/2011 | Fischer | B60R 21/233 280/738 |
| 8,262,130 | B2 * | 9/2012 | Fischer | B60R 21/233 280/739 |
| 9,199,602 | B1 * | 12/2015 | Fischer | B60R 21/239 |
| 2002/0158456 | A1 * | 10/2002 | Fischer | B60R 21/205 280/743.2 |
| 2006/0186656 | A1 * | 8/2006 | Kumagai | B60R 21/231 280/743.2 |
| 2007/0145729 | A1 * | 6/2007 | Ishiguro | B60R 21/239 280/739 |
| 2007/0246920 | A1 * | 10/2007 | Abele | B60R 21/206 280/730.1 |
| 2010/0019473 | A1 * | 1/2010 | Dennis | B60R 21/206 280/729 |
| 2010/0187797 | A1 | 7/2010 | Debler et al. | |
| 2012/0104737 | A1 * | 5/2012 | Fischer | B60R 21/2338 280/742 |
| 2012/0235393 | A1 * | 9/2012 | Fisher | B60R 21/2338 280/742 |
| 2013/0026744 | A1 * | 1/2013 | Fischer | B60R 21/2338 280/742 |
| 2013/0038046 | A1 * | 2/2013 | Inuzuka | B23D 15/145 280/743.2 |
| 2013/0334801 | A1 * | 12/2013 | Williams | B60R 21/239 280/739 |

FOREIGN PATENT DOCUMENTS

| | | |
|---|---|---|
| DE | 102006027371 | 12/2007 |
| DE | 102008028921 | 12/2009 |
| DE | 102009005771 | 7/2010 |
| EP | 1695878 | 8/2006 |
| EP | 1398228 | 10/2008 |

* cited by examiner

VEHICLE OCCUPANT RESTRAINT DEVICE COMPRISING AN ADAPTIVE KNEE AIRBAG

RELATED APPLICATIONS

This application corresponds to PCT/EP2013/001585, filed May 29, 2013, which claims the benefit of German Application No. 10 2012 011 036.7, filed Jun. 5, 2012, the subject matter of which are incorporated herein by reference in their entirety.

BACKGROUND OF THE INVENTION

The invention relates to a vehicle occupant restraint device comprising an inflatable knee airbag. The invention further relates to a method for protecting a vehicle occupant.

The inflating and exhaust behavior of airbags is tested with crash test dummies during impact tests. Crash test dummies are life-size dolls imitating the human body. In order to duly consider the different anatomic conditions of real persons during simulations, the tests are usually carried out with three different dummies: The "50 percent male" having a body height of 175 cm and a weight of 78 kg is supposed to correspond in general to a "normally" sized vehicle occupant, the "95 percent male" having a body height of 188 cm and a weight of 101 kg is supposed to correspond to a tall vehicle occupant and the "5 percent female" having a body height of 152 cm and a weight of 54 kg is to correspond to a short vehicle occupant. Due to the different constitution, in the crash tests the normal seating positions of the different dummies and the distances of particular body parts from the surrounding vehicle components vary accordingly.

In modern vehicle safety systems comprising airbag modules it is endeavored to adapt the safety system increasingly individually to different parameters of a crash situation. A known and advantageous possibility is the use of tensile means such as e.g. tethers by the release of which exhaust orifices of the airbag are opened or closed. Moreover, by those tensile means also the airbag geometry can be influenced and/or an additional airbag volume can be released. For this purpose, activating units are known, e.g. under the acronym "TAU" (tether-activation-unit), by which the release of tethers can be actively controlled. Airbag modules including said activating units are known, for example, from DE 10 2008 028 921 A1 or DE 10 2009 005 771 A1.

SUMMARY OF THE INVENTION

It is the object of the invention to enable the protective effect of an inflated knee airbag to be adapted to the build of a vehicle occupant.

This object is achieved by a vehicle occupant restraint device comprising the features of claim 1. Advantageous and expedient configurations of the vehicle occupant restraint device according to the invention are described in the related subclaims.

The vehicle occupant restraint device according to the invention comprises a knee airbag deployable between an instrument panel and the legs of a vehicle occupant, the knee airbag having an airbag sheath and at least one exhaust orifice formed therein. Furthermore the vehicle occupant restraint device comprises a means for qualifying the build of the vehicle occupant, an activating unit for selectively releasing the exhaust orifice and a control means which actuates the activating unit depending on the qualification of the build of the vehicle occupant.

The invention is based on the idea that an improved protective effect can be obtained especially in the lower body half by passive adaptation of the internal pressure of the knee airbag to the physical constitution of the respective vehicle occupant. The control means provided according to the invention together with the activating unit ensures that the exhaust orifice is released or blocked depending on the build of the vehicle occupant, especially the body height and/or the weight. When a small vehicle occupant is detected before, the exhaust orifice can be released so as to dampen the impact on the knee airbag, whereas in the case of a normally sized vehicle occupant the exhaust orifice is blocked so that the internal pressure of airbag is maintained on a high level for a longer period of time. Thus, independently of the build of the vehicle occupant, always the same amount of gas can be used for inflating the knee airbag, as the internal pressure adapts automatically. A multistage inflator therefore is not required for the solution according to the invention.

For selectively releasing the exhaust orifice a closing member in the form of a flap covering the exhaust orifice on the inside is suited, wherein the flap is detachably fastened to the airbag sheath, especially by a tear seam. If required, the flap can be detached from the airbag sheath at least so far that gas can escape from the knee airbag through the exhaust orifices. The term "flap" is not meant to be restricting but comprises a plurality of possible shapes and configurations. What is essential is the at least partly detachable fastening to the airbag sheath.

According to a preferred embodiment of the invention, the flap is coupled to a tensile means which, in turn, is coupled to the activating unit. The tensile means is an appropriate instrument for "actuating" the flap covering the exhaust orifice as required, especially upon detection of a small vehicle occupant. When no actuation is desired, especially when a (normally) sized vehicle occupant has been detected, the activating unit releases the tensile means so that the tensile means cannot exert any force on the flap.

The length of the tensile means should be dimensioned so that the tensile means is tensioned at the end of the deployment of the knee airbag and thereby detaches the flap at least partly from the airbag sheath. This means that the tensile means retains the flap while the upper airbag portion is further deploying. Thus the flap is automatically detached so that no additional measures are required to release the exhaust orifice.

The flap can be detached in an especially efficient manner, i.e. with comparatively low force expenditure, in a configuration according to which a seam, especially a tear seam, subdivides the flap into an inner portion covering the exhaust orifice and an outer portion and the tensile means is connected to the outer portion. Detaching the flap is comparable in such configuration to peeling off a yoghurt cover.

This principle works best when the outer portion upon which the tensile means acts is guided at an acute angle over the inner portion. Accordingly, the tensile means should be arranged in the knee airbag so that at the end of the deploying operation it draws an acute angle with the inner portion of the flap, preferably within the range of from 0° to 60°.

An arrangement of the exhaust orifice in the upper half, preferably in the upper third of the knee airbag, related to the position of use of the knee airbag is beneficial especially for the afore-mentioned technical implementation by a tensile means, when the preferred main deployment direction of the knee airbag faces (obliquely) upwards along the instrument panel. In this case no deflecting measures or the like are necessary.

According to an advantageous aspect of the invention it is provided that the knee airbag includes a closing member for selectively closing the exhaust orifice, wherein a tensile means coupled to the activating unit acts on the closing member. The activating unit, the tensile means and the closing member altogether form a control means by which the exhaust orifice can be released or blocked depending on the qualification of the build of the vehicle occupant. Basically also intermediate positions of variable efficient exhaust cross-section can be obtained by this control means so as to allow more accurate adaptation of the internal pressure of the airbag to the respective circumstances.

Preferably the activating unit is configured so that it can actively influence the tension of the tensile means. Depending on whether and possibly how strongly the tensile means is tensioned during and after deployment of the knee airbag, the closing member is pulled away from the exhaust orifice so that the exhaust orifice is released or not. As aforementioned, also intermediate positions are basically possible.

In accordance with an advantageous configuration, the closing member includes one or more inwardly protruding recesses at the outer periphery. In the circumferential direction only the area outside the recess or only the areas between the recesses is/are connected to the edge of the exhaust orifice. Such configuration enables the closing member on the one hand to be safely fastened to the edge of the exhaust orifice and, on the other hand, to ensure that upon a tensile effect on the closing member gas can flow past the withdrawn closing member through the recesses.

The gas escaping through the exhaust orifice can be discharged either directly to the ambience or into an overflow chamber for the protection of the vehicle occupants. In the later case, the exhaust orifice does not open into the open air but into the dedicated overflow chamber.

The object of the invention is also achieved by a method for the protection of a vehicle occupant comprising the following steps of:
qualifying the build of the vehicle occupant,
inflating a knee airbag deployable between an instrument panel and the legs of a vehicle occupant and including an airbag sheath and at least one exhaust orifice formed therein with gas; and
adapting the gas exhaust behavior by actuating an activating unit for releasing the exhaust orifice depending on the qualification of the build of the vehicle occupant.

The advantages of the method according to the invention substantially correspond to those of the device according to the invention so that the foregoing statements can be referred to.

Preferably, when qualifying the build of the vehicle occupant, a classification into either of the classes "small vehicle occupant" and "normally sized vehicle occupant" and/or "tall vehicle occupant" is made according to the different dummy heights, as they are employed for typical impact tests.

In accordance with the preferred embodiment of the method according to the invention, at the end of deployment of the knee airbag a tensile means is tensioned which is coupled on the one hand to the activating unit and on the other hand to a closing member covering the exhaust orifice. In this way the closing member is at least partly detached or removed from the exhaust orifice. The tensile means thus simply holds the flap, while the upper airbag portion is further deploying so that automatic detaching or pulling away of the closing member takes place.

Preferably the activating unit is provided, for adapting the gas exhaust behavior, to influence the tension of a tensile means which is coupled to a closing member covering the exhaust orifice depending on the qualification of the build of the vehicle occupant. Depending on whether and possibly how strongly the tensile means is tensioned during and after deployment of the knee airbag, the closing member is pulled away from the exhaust orifice so that the exhaust orifice is released or not. Basically also intermediate positions are possible.

BRIEF DESCRIPTION OF THE DRAWINGS

Further features and advantages of the invention are evident from the following description and from the enclosed drawings which are referred to. The drawings schematically show in.

DESCRIPTION OF EMBODIMENTS

Figure 1:
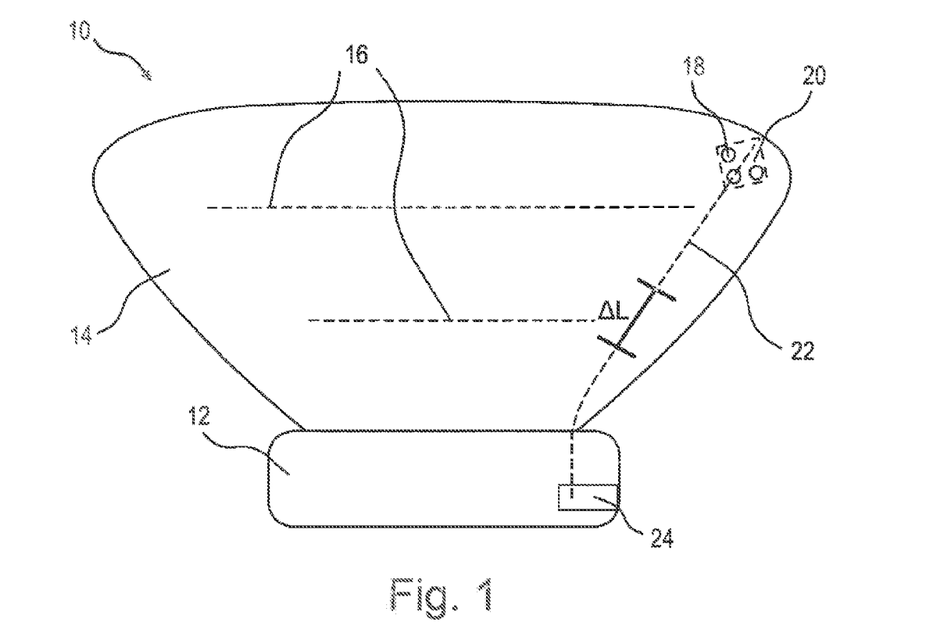
FIG. 1 a top view of a spread knee airbag for a vehicle occupant restraint device not in accordance with the invention.

In FIG. 1 a knee airbag 10 for a vehicle occupant restraint device is shown from the view-point of the vehicle occupant to be protected in a state after having deployed out of a casing 12 by inflating by means of an inflator.

The knee airbag 10 substantially consists of an airbag sheath 14 and includes connecting points 16 for one or more inner tethers. Moreover in the airbag sheath 14 one or more closely adjacent exhaust orifices 18 are formed by which gas can escape from the knee airbag 10 under certain circumstances which will hereinafter be discussed in detail. The exhaust orifices 18 are provided, related to the position of use of the knee airbag 10 shown in FIG. 1, in the upper half, mere exactly speaking in the upper third of the knee airbag 10.

The exhaust orifices 18 are covered on the inside by a closing member. In the shown embodiment the closing member is a flap 20 in the form of a flexible fabric layer or another material which is not dimensionally stable. The flap 20 is fastened to the inside of the airbag sheath 14, especially by one or mere seams, which will hereinafter be discussed in detail. The flap 20 moreover is coupled to one end of the tensile means 22. The opposite end of the tensile means 22 is coupled to an electrically operable activating unit 24 in the casing 12.

The activating unit 24 is selectively operable in response to the build of the vehicle occupant to be protected. For this purpose, the activating unit 24 is connected to a control means (not shown) which in turn receives data from an occupant qualifying means (not shown) and evaluates the same. The occupant qualifying means provides data about the occupant which permit classification into the classes of "small vehicle occupant" and "normally sized vehicle occupant" and, resp., "tall vehicle occupant" as explained in the beginning. The way in which the data are obtained is not important to the function of the vehicle occupant restraint device.

The tensile means 22 can be a ribbon or a string, for example. In the embodiment illustrated in FIG. 1 the tensile means 22 exhibits a length between its two connecting points which is dimensioned such that the tensile means 22 is just not tensioned with a completely deployed and inflated knee airbag 10 or tensioned only so slightly that the tensile means 22 exerts no significant force on the flap 20. Thus the fastening of the flap 20 is not impaired and the flap 20 remains in its position blocking the exhaust orifices 18.

Figure 2:
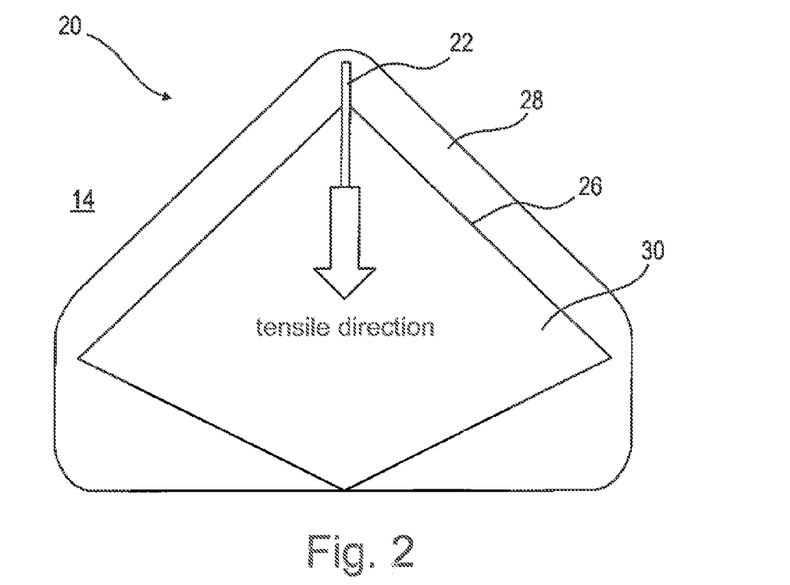
FIG. 2 a top view of a closing member fastened to the knee airbag according to a first embodiment of the invention.
Figure 3:
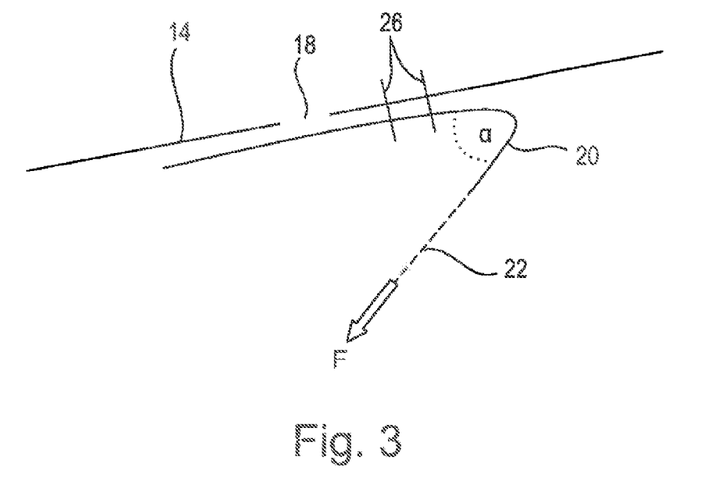
FIG. 3 a lateral sectional view of the knee airbag in the area of the flap according to the first embodiment.

In FIGS. 2 and 3 the flap 20 for covering the one or more exhaust orifices 18 is illustrated in various perspectives. The flap 20 is fastened to the airbag sheath 14 by a seam 26 substantially peripheral along the edge thereof in a largely gastight manner. The seam 26 subdivides the flap 20 into an inner portion 28 covering the exhaust orifices 18 and an outer portion 30 which is loose on one side outside the seam 26. The seam 26 is formed at least partly as a tear seam which tears in the case of a specific load.

The tensile means 22 is connected to the flap 20 at a predetermined position of the outer portion 30. As is evident especially from the side view of FIG. 3, the connecting point is selected so that the tensile means 22 draws an acute angle α with the inner portion 28 of the flap 20, for example within the range of from 0° to 60°. As a matter of course, the inner portion 28 is not completely plane either during inflating or in the finally deployed state of the knee airbag 10. This is not crucial, however, i.e. the acute angle α can be referred to an averaged or interpolated plane corresponding to the inner portion 28.

Figure 4:
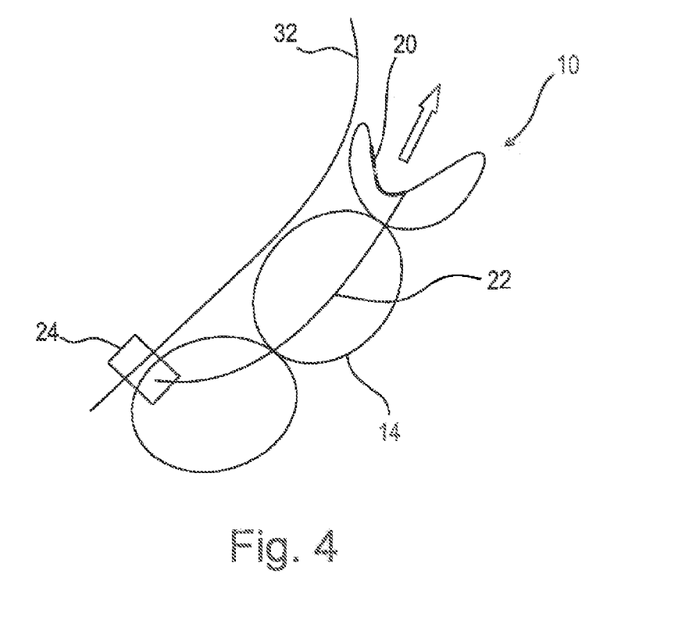
FIG. 4 a lateral sectional view of a vehicle occupant restraint device according to the invention in accordance with the first embodiment during deployment of the knee airbag.
Figure 5:
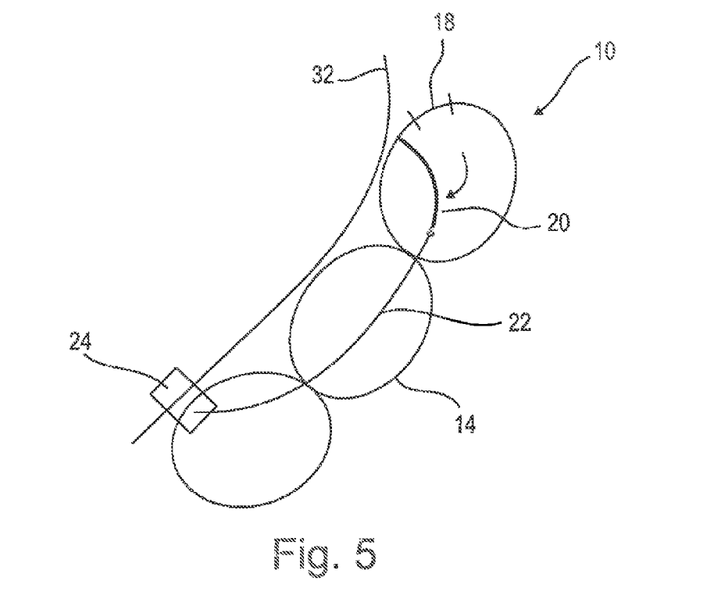
FIG. 5 a lateral sectional view of the vehicle occupant restraint device from FIG. 4 after complete deployment of the knee airbag with released exhaust orifice.
Figure 6:
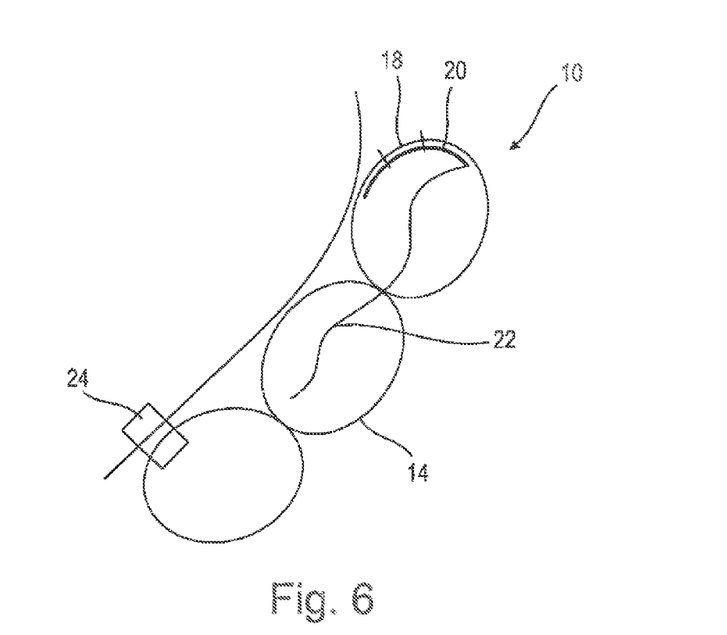
FIG. 6 a lateral sectional view of the vehicle occupant restraint device from FIG. 4 after complete deployment of the knee airbag with blocked exhaust orifice.

In FIGS. 4 to 6 a similar knee airbag 10 as described above is shown in a vehicle, while or after it deploys (has deployed) out of an acceptance between the lower part of an instrument panel 32 of the vehicle and the legs of a vehicle occupant. The knee airbag 10 is subdivided into plural portions in vertical direction by the tethers (not shown). As is visible in FIGS. 4 and 5, the tensile means 22 extends from the activating unit 24 inside the knee airbag 10 to the uppermost portion thereof where the tensile means 22 is bonded to the flap 20.

In contrast to the knee airbag shown in FIG. 1, the tensile means 22 is shortened in this case by a length ΔL, however.

Hereinafter the different operating mode of the vehicle occupant restraint device comprising such knee airbag is described in detail.

FIG. 5 illustrates a situation in which the occupant qualifying means has determined a small vehicle occupant. The control means in this case does not confirm the activating unit 24 so that the tensile means 22 is not released. Due to the shortened length of the tensile means 22, at the end of the deploying operation the latter exerts a tensile force F on the flap 20 at the connecting point in the outer portion 30 (cf. FIGS. 2 and 3). This force defined by the deployment of the upper portion of the knee airbag 10 is so strong that the seam 26 tears. The force transmission via the tensile means 22 is optimal thanks to the acute angle α to the effect that the flap 20 is efficiently peeled off the airbag sheath 14 by the tensile means 22.

By the (partial) detachment of the flap 20 from the airbag sheath 14 the upper portion of the knee airbag 10 can completely deploy with the tensile means 22 keeping the flap 20 away from the exhaust orifices 18. Thus the exhaust orifices 18 are released and gas can escape from the knee airbag 10. The internal pressure of the knee airbag 10 is thus reduced so that the impact of the knees of the small vehicle occupant on the fully inflated knee airbag 10 is dampened.

FIG. 6 illustrates the same situation as FIG. 5, however in the event that the occupant qualifying means has established a normally sized or tall vehicle occupant. In this case the control means actuates the activating unit 24 and thereby triggers the tensile means 22 before the knee airbag 10 has fully deployed. As a result the tensile means 22 cannot exert any tensile force on the flap 20. The flap 20 therefore remains connected to the airbag sheath 14 and does not release the exhaust orifices 18. Thus the internal pressure of the airbag is kept largely constant so as to guarantee a protective effect sufficient for the normally sized or tall vehicle occupant.

As mentioned already in the beginning, the design of the vehicle occupant restraint device is geared to the common specifications in crash tests with 5 percent and 50 percent and, resp., 95 percent dummies in normal seating attitude and position (no so called OOP positions).

FIGS. 7 to 11 relate to a special embodiment which differs from the afore-described embodiment by the design of the closing member (flap) 20 and the arrangement thereof on the airbag sheath 14. Although only one exhaust orifice 18 is shown, basically also plural closely adjacent exhaust orifices may be provided.

Figure 7:
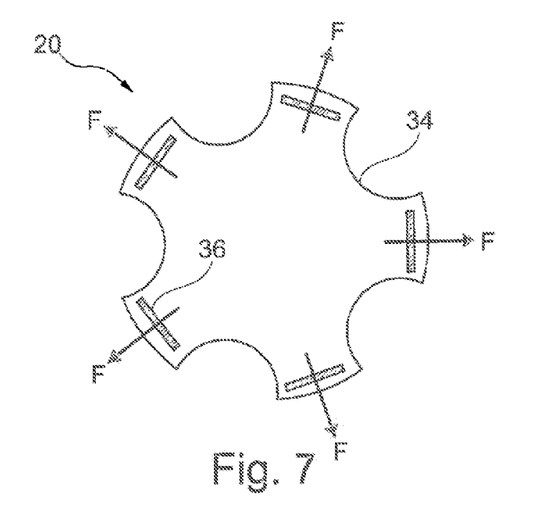
FIG. 7 a top view of a closing member of a knee airbag according to the invention in accordance with a second embodiment.

As is visible in FIG. 7, the flat closing member 20 is substantially circular, wherein at the outer periphery semi-circular recesses 34 are provided at equal distances. Viewed in the circumferential direction, only the areas between the recesses 34 are provided with fixed seams 36 (no tear seams). The individual seams 36 in total result in a curved path. More exactly speaking, the path of the seams 36 substantially corresponds to an (interrupted) circular arc of a circle surrounding the exhaust orifice 18 or a corresponding arc of an ellipse. A corresponding angular path is also possible and is equally supposed to be covered by the term "curved".

Figure 8:
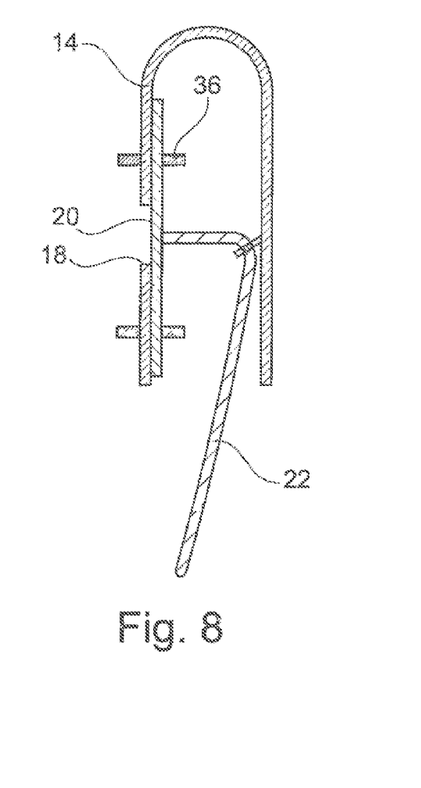
FIG. 8 a detailed sectional view of the knee airbag according to the invention in accordance with the second embodiment with blocked exhaust orifice.

FIG. 8 shows the mounting of the closing member 20 on the airbag sheath 14 by the seams 36. The closing member 20 is arranged so that it completely covers the exhaust orifice 18 and no gas or only very little gas can escape from the knee airbag 10 through the exhaust orifice 18. Opposite to the exhaust orifice 18, approximately in the canter of the closing member 20, the tensile means 22 acts on the closing member 20 on the side facing away from the exhaust orifice 18.

Figure 9:
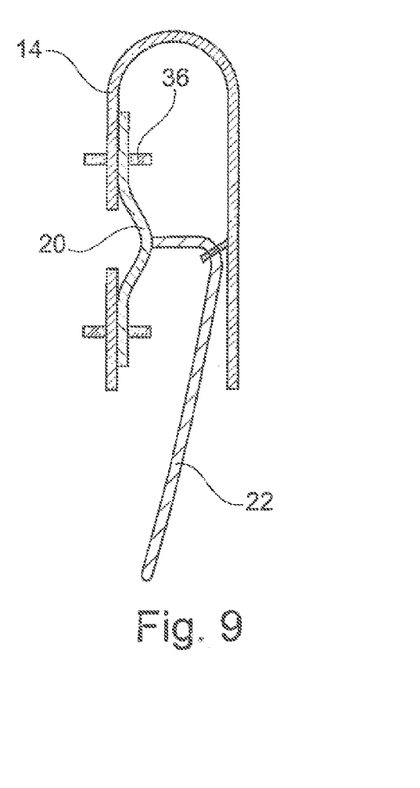
FIG. 9 a detailed sectional view of a knee airbag according to the invention in accordance with the second embodiment with released exhaust orifice.

In contrast to the blocking position of FIG. 8, FIG. 9 shows a situation in which the tensile means 22 is put under tension and therefore partly pulls the closing member 20 away from the exhaust orifice 18 via a deflection arranged for example on the opposite side. This position of the closing member 20 in which, thanks to the recesses 34, gas may exhaust from the knee airbag 10 through the exhaust orifice 18 corresponds to the release position.

The operating mode of the knee airbag 10 including the closing member 20 according to FIGS. 7 to 9 is similar to that of the afore-described embodiment.

When the occupant qualifying means has determined a small vehicle occupant, the control means does not actuate the activating unit 24 so that the tensile means 22 is not released. Due to the shortened length of the tensile means 22, at the end of the deploying operation the latter exerts a tensile force on the closing member 20. Thus the tensile means 22 pulls the closing member 20—as illustrated in FIG. 9—away from the exhaust orifice 18 so that gas can escape from the knee airbag 10. Thereby the internal pressure of the knee airbag 10 is reduced so that the load of the knees of the small vehicle occupant is dampened.

When the occupant qualifying means determines a normally sized or tall vehicle occupant, on the other hand, the control means actuates the activating unit 24 and releases the tensile means 22. Since the tensile means 22 cannot exert any tensile force on the closing member 20, the tensile forces in the airbag sheath 14 and the internal pressure of the airbag ensure that the closing member 20 is pressed onto the exhaust orifice 18 and closes the same as shown in FIG. 8. The internal pressure of the airbag is thus kept largely constant so as to guarantee a protective effect sufficient for the normally sized vehicle occupant.

The closing member 20 does not necessarily have to be circular in order to fulfill the described function. The shape of the recesses 34, too, may deviate from a semi-circle. Basically already one single recess 34 is sufficient as long as the closing member 20 is capable of completely covering the exhaust orifice 18.

In both embodiments the gas escaping through the exhaust orifice(s) 18 can exhaust either directly to the ambience or, as described hereinafter by way of FIGS. 10 and 11, into an overflow chamber of the knee airbag.

Related to the flow direction during filling the knee airbag 10, an overflow chamber 38 of the knee airbag 10 is provided behind the exhaust orifice 18. The overflow chamber 38 is formed by an additional layer 40 that may be fastened to the outside of the airbag sheath 14 by a tear seam.

Figure 10:
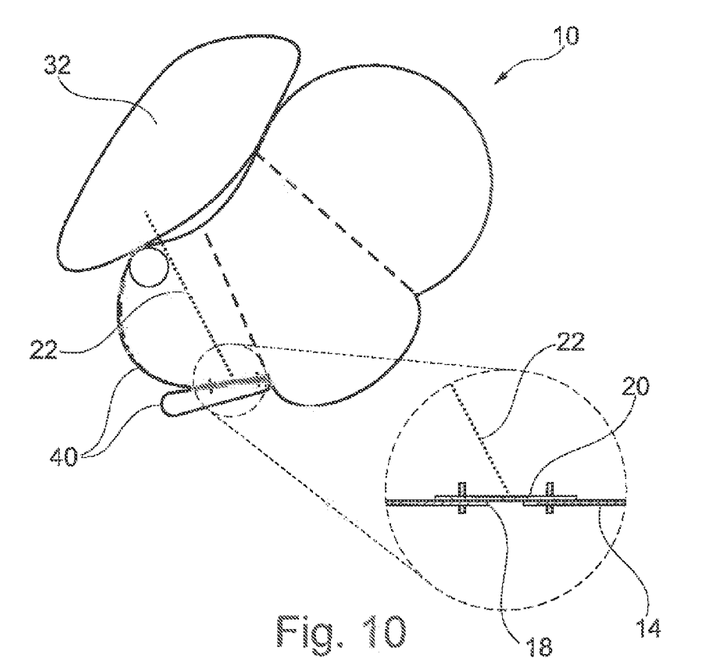
FIG. 10 a lateral sectional view of the knee airbag according to the invention in accordance with the second embodiment with non-filled overflow chamber.

FIG. 10 illustrates the knee airbag 10 in the inflated state with a closed exhaust orifice 18. The overflow chamber 38 is not filled with gas in this case, because no gas can flow past the closing member 20.

Figure 11:
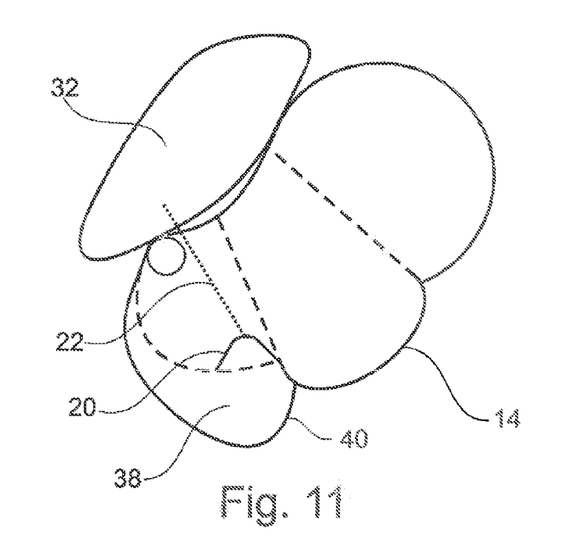
FIG. 11 a lateral sectional view of the knee airbag according to the invention in accordance with the second embodiment with filled overflow chamber.

When the closing member 20 is removed from the exhaust orifice 18, however, i.e. adopts its release position, gas can flow into the overflow chamber 38, as is shown in FIG. 11.

Compared to FIGS. 4 to 6, the FIGS. 10 and 11 show a variant of the knee airbag 10 in which the exhaust orifice 18 is not arranged in the upper third but in the lower third of the knee airbag 10. Accordingly, also the overflow chamber 38 is provided in the lower third of the knee airbag 10.

It is possible, as a matter of course, within the scope of the invention to combine particular aspects of the various embodiments.

LIST OF REFERENCE NUMERALS

10 Knee airbag
12 casing
14 airbag sheath
16 connecting points
18 exhaust orifices
20 closing member (flap)
22 tensile means
24 activating unit
28 seam
28 inner portion
30 outer portion
32 instrument panel
34 recesses
38 seams
38 overflow chamber
40 additional airbag layer

The invention claimed is:

1. A vehicle occupant restraint device comprising:
a knee airbag (10) deployable between an instrument panel (32) and legs of a vehicle occupant and including an airbag sheath (14) and at least one exhaust orifice (18) formed therein,
a means for qualifying a build of the vehicle occupant,
an activating unit (24) for selectively releasing the at least one exhaust orifice (18), and
a control means which actuates the activating unit (24) depending on the qualification of the build of the vehicle occupant, and
wherein the knee airbag (10) includes a closing member (20) for selectively closing the at least one exhaust orifice (18), wherein a tensile means (22) which is coupled to the activating unit (24) acts on the closing member (20), the the closing member extending primarily in a plane, an angle between the plane and the tensile means being within a range from 30° to 60°.

2. The vehicle occupant restraint device according to claim 1, wherein the at least one exhaust orifice (18) opens into an overflow chamber (38).

3. The vehicle occupant restraint device according to claim 1, wherein the at least one exhaust orifice (18) is provided in the upper half of the knee airbag (10).

4. The vehicle occupant restraint device according to claim 3, wherein the activating unit (24) is configured so that it is adapted to actively influence a tension of the tensile means (22).

5. The vehicle occupant restraint device according to claim 1, wherein the at least one exhaust orifice (18) is covered on its inside by the closing member in the form of a flap (20) which is detachably fastened to the airbag sheath (14) by a tear seam.

6. The vehicle occupant restraint device according to claim 5, wherein the flap (20) is coupled to the tensile means (22) which in turn is coupled to the activating unit (24).

7. The vehicle occupant restraint device according to claim 6, wherein a length of the tensile means (22) is dimensioned so that the tensile means (22) is tensioned at an end of deployment of the knee airbag (10) and thereby detaches the flap (20) at least partly from the airbag sheath (14).

8. The vehicle occupant restraint device according to claim 6, wherein a seam (26), especially a tear seam, subdivides the flap (20) into an inner portion (28) covering the exhaust at least one orifice (18) and an outer portion (30) and in that the tensile means (22) is connected to the outer portion (30).

9. A method for protecting a vehicle occupant comprising the steps of:
   qualifying a build of the vehicle occupant;
   inflating a knee airbag (10) deployable between an instrument panel (32) and legs of a vehicle occupant and including an airbag sheath (14) and at least one exhaust orifice (18) formed therein with gas, the at least one exhaust orifice being closed prior to deployment of the knee airbag by a closing member extending primarily in a plane; and
   adapting the gas exhaust behavior in that an activating unit (24) is actuated to cause a tensile means coupled to the activating unit to act on the closing member for releasing the at least one exhaust orifice (18) depending on the qualification of the build of the vehicle occupant, an angle between the plane and the tensile means being within a range from 30°-60°,
   and, when the build of the vehicle occupant is qualified, a classification into one of a class of "small vehicle occupant," "normally sized vehicle occupant" or "tall vehicle occupant" is made.

10. The method according to claim 9, wherein the tensile means (22) is tensioned at an end of deployment of the knee airbag (10) and thereby detaches or pulls away the closing member (20) at least partly from the at least one exhaust orifice (18).

11. The method according to claim 9, wherein the activation unit (24) influences a tension of the tensile means (22) depending on the qualification of the build of the vehicle occupant for adapting the gas exhaust behavior.

12. A vehicle occupant restraint device comprising:
   a knee airbag (10) deployable between an instrument panel (32) and leas of a vehicle occupant and including an airbag sheath (14) and at least one exhaust orifice (18) formed therein, the at least one exhaust orifice being closed prior to deployment of the knee airbag,
   a means for qualifying a build of the vehicle occupant,
   an activating unit (24) for selectively releasing the at least one exhaust orifice (18), and
   a control means which actuates the activating unit (24) depending on the qualification of the build of the vehicle occupant,
   wherein the knee airbag (10) includes a closing member (20) for selectively closing the at least one exhaust orifice (18), wherein a tensile means (22) which is coupled to the activating unit (24) acts on the closing member (20),
   wherein the at least one exhaust orifice (18) is provided in the upper half of the knee airbag (10), and
   wherein at an outer periphery the closing member (20) includes one or more inwardly protruding recesses (34) and in a circumferential direction only an area outside the recess and, respectively, the areas between the recesses (34) is/are connected to an edge of the at least one exhaust orifice (18).

* * * * *